United States Patent [19]

Beri

[11] Patent Number: 5,255,762
[45] Date of Patent: Oct. 26, 1993

[54] BRAKE SHOE ASSEMBLY WITH FASTENERS

[75] Inventor: Michael Beri, North York, Canada

[73] Assignee: Tennessee Gas Pipeline Company, Lincolnshire, Ill.

[21] Appl. No.: 753,118

[22] Filed: Aug. 30, 1991

[51] Int. Cl.$^5$ .............................. F16D 69/04
[52] U.S. Cl. ...................... 188/250 G; 188/250 A; 188/234
[58] Field of Search ........... 188/250 G, 250 B, 250 A, 188/250 R, 255, 73.1, 73.2, 73.32, 250 E, 250 F, 234, 218 A, 218 XL, 218 R, 251 R, 258, 242, 251 A, 251 M, 247, 248; 192/107 R; 403/22; 267/153, 141, 141.4, 141.5

[56] References Cited

U.S. PATENT DOCUMENTS

| | | |
|---|---|---|
| 1,657,238 | 1/1928 | Thompson . |
| 1,682,319 | 8/1928 | Bluhm . |
| 1,796,433 | 3/1931 | Blume . |
| 1,917,820 | 7/1933 | Brackett . |
| 1,935,348 | 11/1933 | Blume . |
| 1,941,656 | 1/1934 | Blume . |
| 1,952,903 | 3/1934 | Blume . |
| 2,164,015 | 6/1939 | Kateley ............... 188/234 |
| 2,239,574 | 4/1941 | Shell . |
| 2,256,752 | 9/1941 | Saurer ............... 267/141.5 |
| 2,879,866 | 3/1959 | Newell ............... 188/234 |
| 3,027,979 | 4/1962 | Pocock ............ 188/251 R X |
| 4,227,722 | 10/1980 | Barber ............... 403/22 X |
| 4,316,675 | 2/1982 | Melicque ............... 403/22 |
| 4,569,424 | 2/1986 | Taylor, Jr. ............... 188/250 G |
| 4,858,732 | 8/1989 | Taylor, Jr. . |

FOREIGN PATENT DOCUMENTS

| | | | |
|---|---|---|---|
| 237444 | 10/1960 | Australia | ............... 267/141.5 |
| 780088 | 7/1957 | United Kingdom | ............... 188/234 |

Primary Examiner—Douglas C. Butler
Attorney, Agent, or Firm—Harness, Dickey & Pierce

[57] ABSTRACT

This invention relates to brake components having mechanically detachable friction members. The friction member of the present invention has a plate with a plurality of apertures. This apertured plate has a first surface that abuts a mounting surface on a brake shoe member or the like. The apertured plate has a second surface, opposite of the first surface, with friction material affixed thereto. The apertured plate is detachably fastened to the mounting surface by fasteners, thereby detachably fastening the friction member thereto.

6 Claims, 2 Drawing Sheets

BRAKE SHOE ASSEMBLY WITH FASTENERS

BACKGROUND OF THE INVENTION

This invention relates generally to brake mechanisms and more particularly to a brake shoe having a detachable member which is comprised of friction material affixed to an apertured plate.

Typically, brake shoes utilize friction pads that are bonded directly to a mounting surface on the brake shoe. In addition to this bonding, the attachment of a friction pad is commonly reinforced with threaded fasteners, rivets or the like. These reinforcing fasteners pass through bores in the friction material and the mounting surface to clampingly engage the friction pad against the shoe. Accordingly, the exterior surface of the friction pads are interrupted by these bores and are therefore not continuous.

Although this conventional method of attaching the friction pad to the shoe member is adequate, it is desirable to have a stronger bond between the friction pad and the shoe member to enhance friction pad shear strength capabilities. It is also desirable to have a larger, continuous exterior surface on a friction pad, with the pad being readily detachable from the shoe member.

SUMMARY OF THE INVENTION

The invention involves a brake component having a mechanically detachable friction member affixed to a supporting means. The supporting means has a support surface that abuts against one surface on an apertured plate. Friction material is affixed to a second surface on the opposite side of this apertured plate such that when the apertured plate is placed adjacent to the supporting means, the apertured plate is sandwiched between the friction material and the supporting means. The present invention further utilizes fastening means for detachably fastening the apertured plate such that it abuts the supporting means, thereby detachably fastening the friction material thereto. This fastening is accomplished by aligning the apertured plate upon the support surface and detachably engaging the fastening means.

Thus, it is one objective of the present invention to provide an exposed continuous exterior surface on a friction member.

It is another objective of the present invention to provide a friction member having a greater working surface area.

It is yet another objective of the present invention to provide a friction member that is readily removable from the shoe member.

A still further objective of the present invention is to provide enhanced attachment between the friction member and the shoe member such that the shear strength capabilities of the friction member are elevated.

These and other advantages and features will become apparent from the following description and claims taken in conjunction with the accompanying drawings.

DETAILED DESCRIPTION OF THE PREFERRED EMBODIMENT

Figure 1:
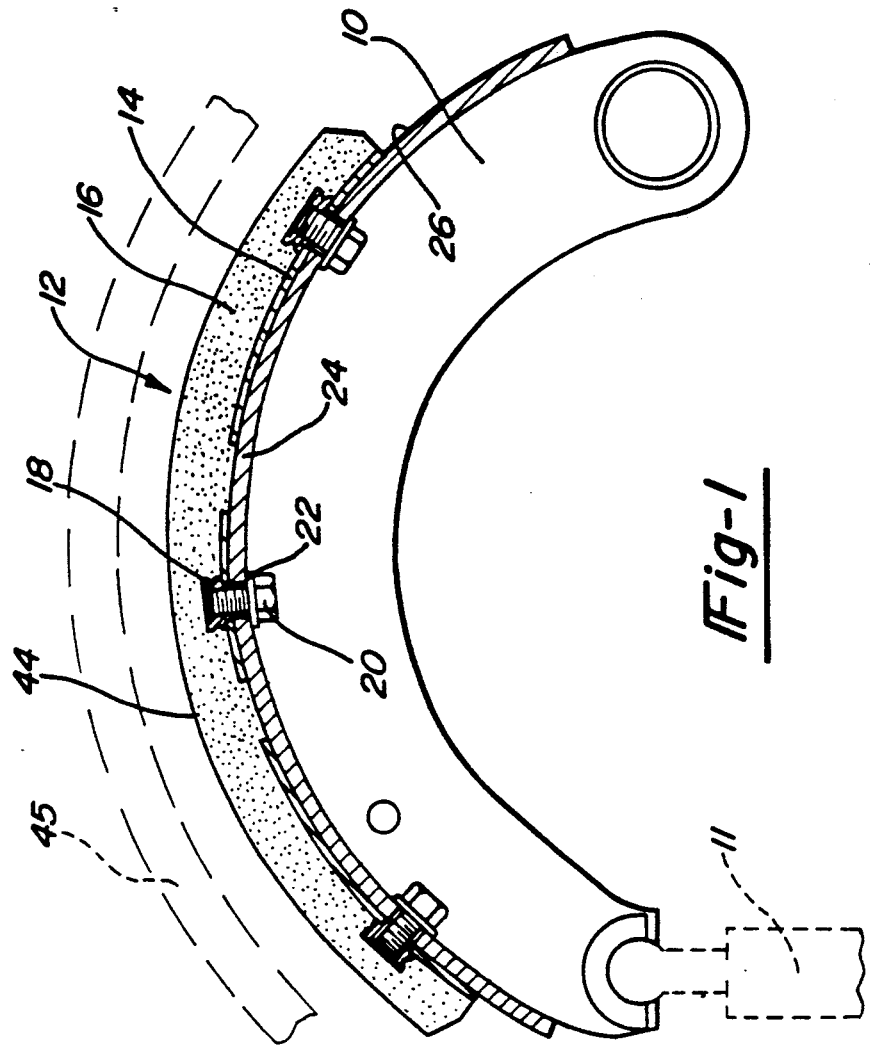
FIG. 1 is a cross sectional view of a brake shoe arranged in accordance with the principles of the present invention showing friction material affixed to an apertured plate, which is, in turn, fastened to a shoe member by a plurality of bolts which extend through bores in the shoe member and apertures in the apertured plate to engage with corresponding nuts.
Figure 2:
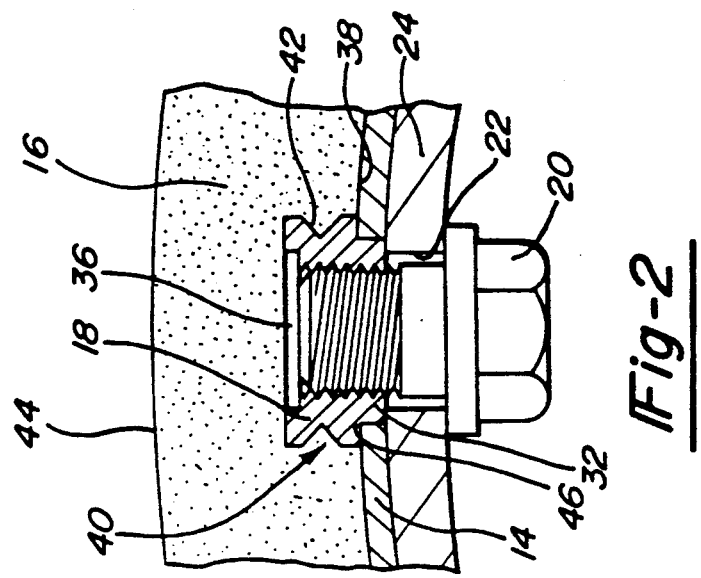
FIG. 2 is an enlarged cross sectional view of a portion of the brake shoe shown in FIG. 1 further illustrating attachment of the friction material to the shoe.

Referring now to the drawings and in particular FIGS. 1 and 2, a brake shoe member 10, having a removably attached friction member 12, a brake drum 45 and an actuator 11 are shown. The friction member 12 is comprised of an apertured plate 14 and a pad of friction material 16 affixed to the apertured plate 14. A plurality of retaining nuts 18 disposed between the apertured plate 14 and the friction material 16 are shown to be engaged by bolts 20. These bolts 20 pass through bores 22 in a support plate 24 on the shoe member 10 and clamp the friction member 12 against the support plate 24.

Figure 3:
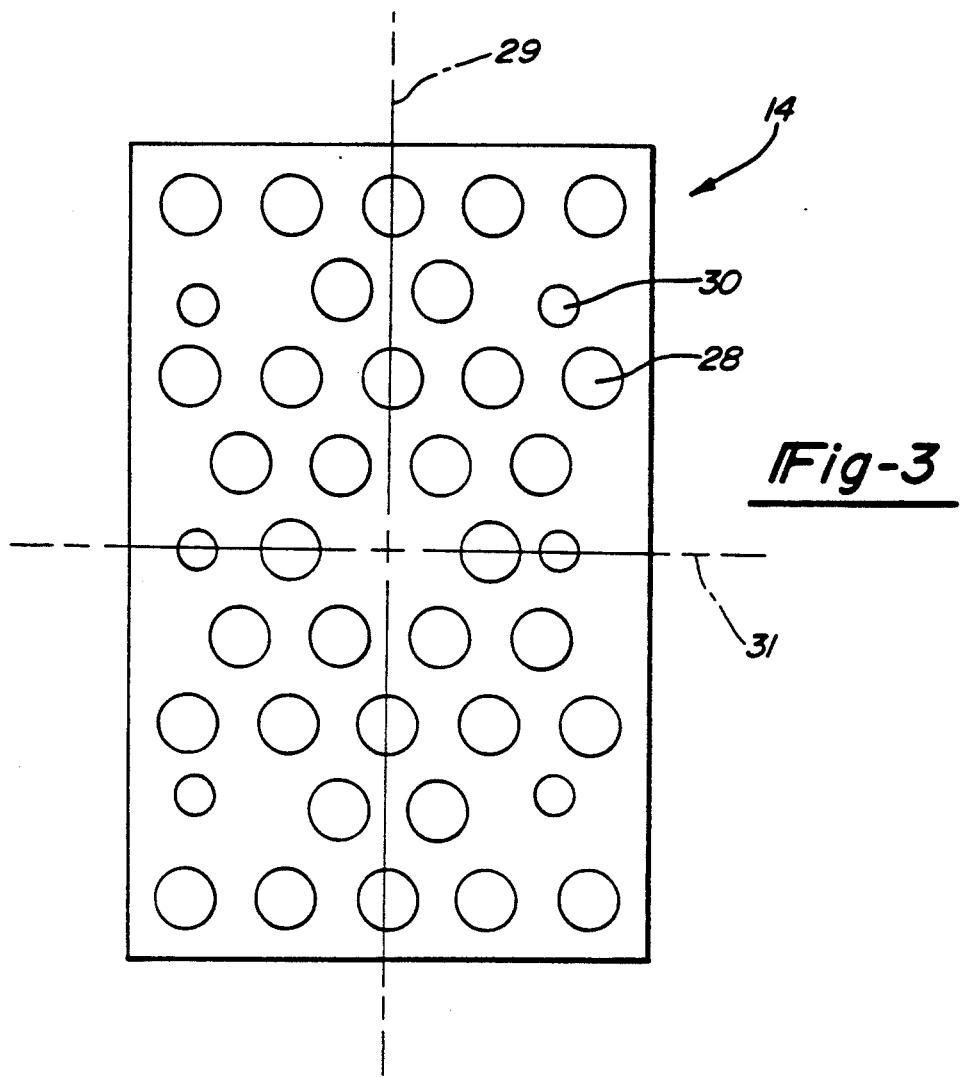
FIG. 3 is a plan view of one embodiment of the apertured plate of the present invention.

Selecting an appropriate apertured plate 14, such as the one shown in FIG. 3, is a first priority in achieving a good bond between the apertured plate 14 and the friction material 16. This plate 14 is preferably made of a relatively low carbon steel such as SAE 1010 or 1020. As shown in FIG. 1, this plate 14 has a radius that corresponds to that of the support surface 26 on the shoe member 10, such that the apertured plate 14 can achieve and maintain full contact with the support surface 26. Furthermore, the apertured plate 14 has a thickness that is generally less than the thickness of the friction material 16. For example, in the embodiment depicted in FIG. 3, the apertured plate 14 is made from a 12 gage thickness material while the friction material 16 is of a significantly larger thickness.

The hole pattern selected for any particular apertured plate is based on the holes being a distance away from one another and from the edge of the plate. The embodiment depicted in FIG. 3, utilizes a minimum distance between the holes 28 that is equal to the radius of the holes 28. This embodiment also utilizes a hole pattern consisting of nine rows and nine columns of larger diameter apertures 28; the hole pattern is symmetric about a central longitudinal axis 29 and a central transverse axis 31.

The general pattern of the holes 28 is such that each hole 28 in a particular column is centered between two adjacent holes 28 in an adjacent column. Furthermore, each hole 28 in a particular row is centered between two adjacent holes 28 in an adjacent row. Thus, the holes 28 will also align diagonally, however, this pattern can vary at locations where smaller diameter apertures are placed for the retaining nuts 18. Note that in the preferred embodiment, there are six smaller diameter apertures 30 which are used for accessing the retaining nuts 18 disposed within the friction material 16.

The friction material 16 is affixed to the apertured plate 14 by a molding operation that integrally molds the material 16 into the larger apertures 28 and about the retaining nuts 18. This molding operation involves first inserting the retaining nuts 18 shown in FIG. 4 into the smaller diameter apertures 30 in the apertured plate 14. This is accomplished by inserting the cylindrical shoulder 32, extending downward from the body 34 of the nut 18, into the apertures 30. Note that the cylindrical shoulder 32 on each nut 18 fits in a corresponding smaller aperture 30 with approximately one thousandth of an inch clearance. Once the nuts 18 are inserted into the apertured plate 14, caps 36 are placed over the nuts 18, as shown in FIG. 2, to protect the threads from the molded friction material 16. The next step is to coat the outer surface of the apertured plate 14 with a phenolic resin adhesive. This resin is permitted to dry before going further in the molding process. A block of conventional friction material 16 having a surface 38 corresponding to the shape of the apertured plate 14 is then placed over the coated plate 14 such that it rests upon the retaining nuts 18. The entire assembly is then placed into a die in a press. Note that conventional friction materials utilized in this operation are materials such as non-asbestos friction material.

Figure 4:
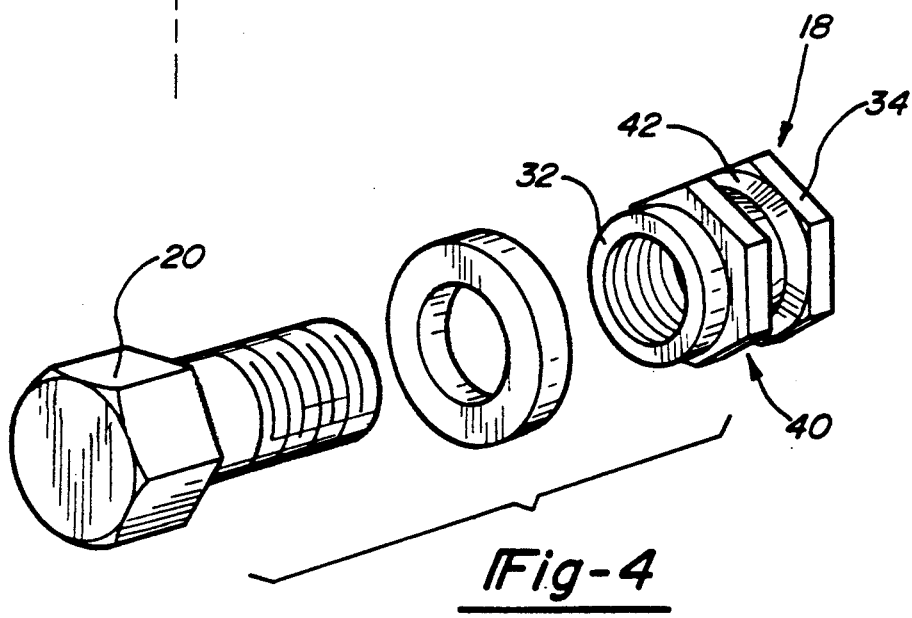
FIG. 4 is a perspective view of an internally threaded retaining nut of the type that is disposed between the friction material and the apertured plate illustrating a 45° annular groove in the hexagonal body portion of the nut and a cylindrical shoulder extending axially from this body portion, with a bolt that engages this retaining nut also shown in accordance with the principles of the present invention.

A pressing operation then applies pressure and heat to this configuration such that the friction material 16 is integrally molded over and around the retaining nuts 18 and down into the larger apertures 28. The larger apertures 28 are filled with friction material 16 such that the friction material 16 is flush with the lower surface of the apertured plate 14. A groove 40 in the retaining nut 18, which is best illustrated in FIG. 4, is also filled with friction material 16 thereby providing a surface 42 on the nut 18 that grips friction material 16 as the retaining nut 18 clampingly engages the friction member 12 against the support surface 26. Moreover, the pressing operation causes the phenolic resin coating on the apertured plate 14 and phenolic resin that is present in the friction material 16 to bond the friction material 16 to the apertured plate 14.

Since this novel friction member 12 does not require through holes to mount it to a brake shoe member 10, the pressing operation leaves a continuous outer surface 44 on the friction member 12. This results in a more evenly distributed load on the friction member 12, a greater amount of surface area 44 for contacting a brake drum 45 or the like, and a reduced noise level, which is generally associated with discontinuous friction members. Furthermore, a friction member 12 having a continuous exterior surface 44 eliminates the problem of contamination lodging in discontinuities on the friction member 12, thereby reducing brake drum degradation.

Once the friction member 12 of the preferred embodiment is completed, the friction member 12 can be detachably affixed to the shoe member 10 as follows. The friction member 12 is first placed adjacent the shoe member support surface 26 such that the retaining nuts 18 and their corresponding smaller apertures 30 align with corresponding bores 22 in the shoe member support surface 26. Thus, as shown in FIG. 1, the apertured plate 14 is sandwiched between the friction material 16 and the shoe member support surface 26. Bolts 20, such as the one shown in FIG. 4, are then passed through the clearance bores 22 and are threadingly engaged with the retaining nuts 18. These bolts 20 are preferably tightened to a torque of approximately 25 foot pounds as compared with 18 to 22 foot pounds for conventional friction pads. Greater torquing capability is a result of the retaining nuts 18 directly engaging a surface 46 on the apertured plate 14 rather than only engaging the friction material 16, as was common with typical prior art friction pads.

As a result of this unique means for fastening a friction member 12 to a brake shoe member 10, the shear strength capabilities of this friction member 12 exceeds the shear strength of typical prior art friction pads. For example, the minimum acceptable shear value for bonded linings is 50,000 PSI as set forth by SAE J840 Test Procedure. A friction member 12 mounted to a shoe member 10 in accordance with the principles herein, results in shear values in excess of 65,000 PSI. Accordingly, this invention offers tremendous advantage over the prior art methods for affixing friction pads to a shoe member.

It should be understood that various modifications of the preferred embodiment will become apparent to those skilled in the art after a study of the specification, drawings, and the following claims.

I claim:

1. A brake system for a vehicle comprising:
   (a) a rotatable brake drum coupled to said vehicle;
   (b) at least one brake shoe member coupled to a portion of said vehicle;
   (c) a friction member having a friction material with a generally continuous first surface, said friction material having a second surface rigidly affixed to a plate with a plurality of apertures such that said friction material extends into at least one of said apertures, said friction member further having a plurality of retainers disposed within said friction material such that each of said retainers is positioned adjacent to one of said apertures thereby permitting access to said retainers through said plate, each of said retainers having a cylindrical portion that extends into said adjacent aperture and directly abuts a portion of said plate defining said adjacent aperture, each of said retainers further having a radial shoulder portion extending from said cylindrical portion that directly abuts said plate, and an extending portion that extends into said friction material in a direction generally perpendicular to said radial shoulder, said extending portion defining a groove to provide additional surface area in contact with said friction material;
   (d) a plurality of fasteners which each pass through one of a plurality of bores in said brake shoe member, and further pass through one of said apertures in said plate to removably engage with one of said retainers thereby clamping said plate in direct abutting engagement against a surface on said brake shoe member; and
   (e) means for displacing said brake shoe such that said first surface of said friction material engages said rotatable drum to retard rotation of said drum.

2. The invention of claim 1 wherein said plate is made of a low carbon steel.

3. The invention of claim 1 wherein said thickness of said plate is 12 gage.

4. The invention of claim 1 wherein said friction material is made of a conventional brake pad material.

5. The invention of claim 1 wherein said first surface of said friction material is arcuate.

6. The invention of claim 1 wherein said retainers are comprised of a plurality of nuts and said fasteners are comprised of corresponding bolts which pass through a plurality of bores in said brake shoe member and through said apertures to engage said nuts.

* * * * *

UNITED STATES PATENT AND TRADEMARK OFFICE
CERTIFICATE OF CORRECTION

PATENT NO. : 5,255,762
DATED : October 26, 1993
INVENTOR(S) : Michael Beri

It is certified that error appears in the above-identified patent and that said Letters Patent is hereby corrected as shown below:

On the title page, item (73): Assignee, should read --TENNECO HEAVY DUTY

BRAKE LTD.--

Signed and Sealed this

Twenty-eighth Day of June, 1994

Attest:

BRUCE LEHMAN

Attesting Officer     Commissioner of Patents and Trademarks